(12) United States Patent
Curcio, Jr. et al.

(10) Patent No.: US 8,089,960 B2
(45) Date of Patent: Jan. 3, 2012

(54) HIGHLY FLEXIBLE AND EFFICIENT MAC TO PHY INTERFACE

(75) Inventors: Joseph A. Curcio, Jr., Roseville, CA (US); Mark A. Gravel, Roseville, CA (US); Daniel J. Dove, Colfax, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1140 days.

(21) Appl. No.: 11/669,813

(22) Filed: Jan. 31, 2007

(65) Prior Publication Data

US 2008/0181212 A1 Jul. 31, 2008

(51) Int. Cl.
*H04J 3/00* (2006.01)
*H04L 1/00* (2006.01)
*H04L 12/28* (2006.01)

(52) U.S. Cl. ........................................ 370/389; 370/229

(58) Field of Classification Search .................. 370/230, 370/230.1, 232, 235, 351, 360
See application file for complete search history.

(56) References Cited

U.S. PATENT DOCUMENTS

| | | | | |
|---|---|---|---|---|
| 5,909,564 | A * | 6/1999 | Alexander et al. | 710/316 |
| 6,983,342 | B2 * | 1/2006 | Helenic et al. | 710/305 |
| 7,237,035 | B1 * | 6/2007 | Damle | 709/236 |
| 7,317,733 | B1 * | 1/2008 | Olsson et al. | 370/466 |
| 2003/0137975 | A1 * | 7/2003 | Song et al. | 370/353 |
| 2004/0078494 | A1 * | 4/2004 | Lennox et al. | 710/1 |

* cited by examiner

*Primary Examiner* — Ayaz Sheikh
*Assistant Examiner* — Blanche Wong

(57) ABSTRACT

A plurality of media access controllers (MACs) are time division multiplexed with one or more serializer/deserializer (SerDes) devices, wherein there are more MACs than SerDes devices and/or a single multi-rate Ethernet MAC is able to communicate with a multi-rate PHY spanning speeds from 10 megabits per second to 10 gigabits per second using the same framing mechanism and structure.

19 Claims, 5 Drawing Sheets

HIGHLY FLEXIBLE AND EFFICIENT MAC TO PHY INTERFACE

TECHNICAL FIELD

This application relates in general to data communication, and in specific to an efficient media access controller chip to physical link interface.

BACKGROUND OF THE INVENTION

A media access controller or MAC is often located within a semiconductor device or "chip". The MAC is an IEEE standard implementation and operates according to the standard for an IEEE 802.3 media access controller, which is hereby incorporated herein by reference. One function of a MAC is to communicate packet data over a physical medium, e.g. an optical fiber or a conductive wire. In other words, the MAC is the interface between the physical medium and the higher layer functions in a device, such as an operating system, an Ethernet bridge, a switch, or a routing function. The MAC communicates with other devices, e.g. other MACs located on the chip (or remote chips) through the use of a serializer/desterilizer (SerDes) device that converts parallel data from the MAC into serial data for transmission over the physical medium. The SerDes also converts received serial data into parallel data for use with its associated MAC. The current state of the art for gigabit and slower Ethernet MAC interfaces is to use one SerDes for each MAC. Since there is only one MAC per each SerDes, the speeds of the MAC and the SerDes are about the same. For 10 gigabit Ethernet MAC interfaces, the most common interface is called XAUI, which uses four SerDes for each MAC.

BRIEF SUMMARY OF THE INVENTION

The present invention is directed to a system and method which involves a system for handling data comprising a plurality of data controllers, wherein each source operates with parallel data; a framer that forms at least one data frame with the data from the data sources; at least one serializer/deserializer device (SerDes) that receives the data frame from the framer and produces a serial data stream of the frame, and provides the data stream to a physical medium for transmission to a Destination; wherein a number of data controllers is greater than a number of SerDes devices.

Embodiments of the invention may also communicate data from a single data controller at speeds from 10 megabits per second up to 10 gigabits per second using a common protocol for communication. In one example, multiple data controllers are framed into a single SerDes. In other words, the invention supports channel widths from one to a plurality. A substantial value of this interface is its flexibility. It may be used for different applications. For example, it may serially interface between multi-rate MAC(s) and PHY(s) that span 10M to 10G data rates. It may also efficiently connect multiple MACs to multiple PHY devices.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

One problem with the existing state of the art is that as the number of MACs is increasing on a chip, the number of required SerDes also increases. This arrangement becomes expensive, as the costs of the silicon area, package pins, and power requirements for each additional SerDes becomes prohibitive. In addition, the existing state of the art for 10 gigabit interfaces (XAUI) does not provide for multi-speed communication.

One embodiment of the invention is to associate more than one MAC to each SerDes device. This may be accomplished by multiplexing multiple MACs to a one or more SerDes devices. For example, in one arrangement eight MACs may be time division multiplexed to one SerDes device. This saves the system from having seven SerDes devices, which saves silicon area, pin count, package size, and cost. Embodiments of the invention may be used in an Ethernet switch.

Embodiments of the invention may also communicate data from a single data controller at speeds from 10 megabits per second up to 10 gigabits per second (or higher) using a common protocol for communication as would be used in the instance where multiple controllers are framed into a single SerDes. In other words, embodiments of the invention support channel widths from one to a plurality. Embodiments of the invention also provide for a flexible interface. The interface can be used for different applications. For example, it may serially interface between multi-rate MAC(s) and PHY(s) that span 10 M to 10 G data rates. It may also efficiently connect multiple MACs to multiple PHY devices.

Figure 1:
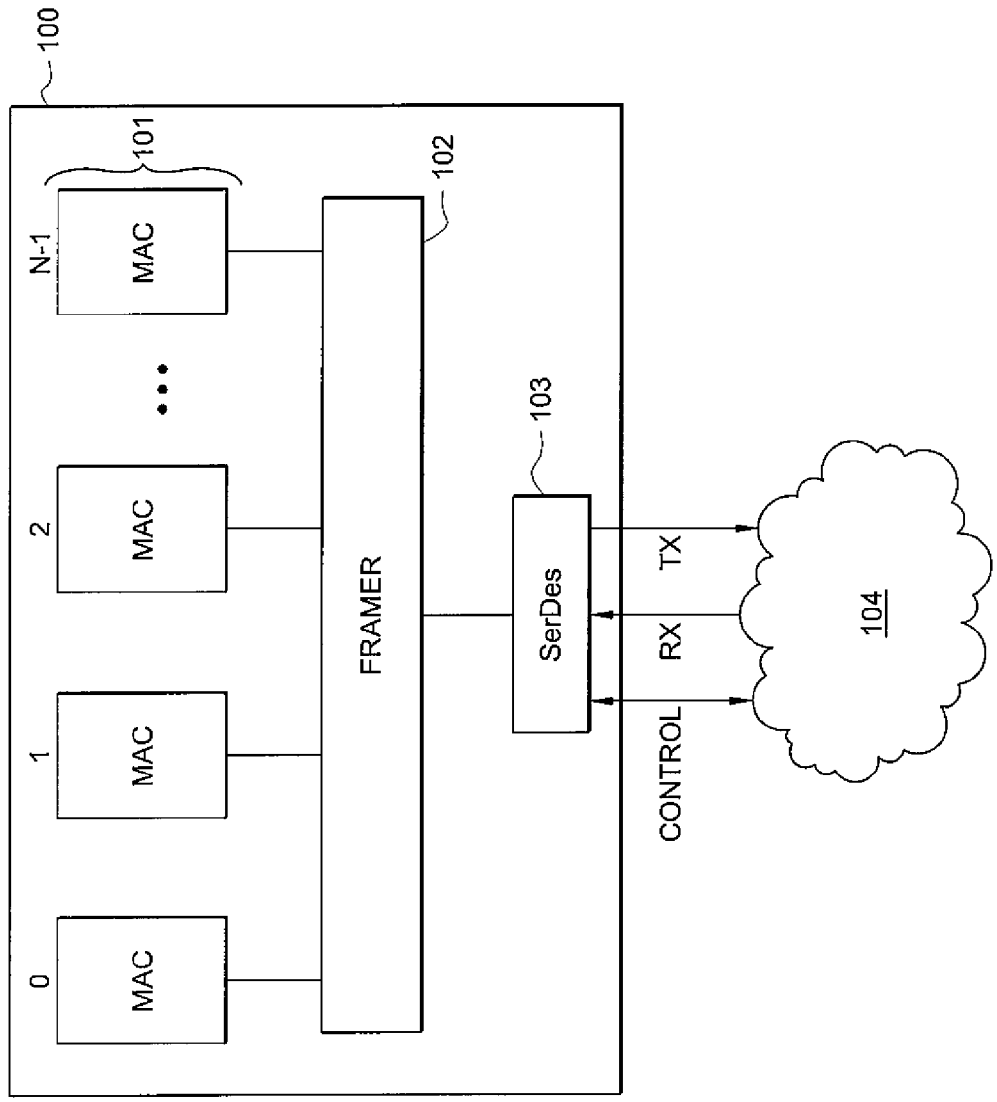
FIG. 1 depicts an arrangement of media access controllers and a serializer/deserializer according to embodiments of the invention.

FIG. 1 depicts an exemplary arrangement for one embodiment that uses a single SerDes 103 to multiplex the data from n MACs 101. In this arrangement an ASIC (application specific integrated circuit) chip 100 includes n MACs 101 that are connected to a framer 102. For transmission, the framer receives that data from the MACs and packs the data into frames. For reception, the framer 102 unpacks the data from a received frame(s) and provides the data to the appropriate MAC(s).

The framer, through multiplexing, packs data from n MACs into a frame or frames of data. The framer may also pack control signals into the frame or the control signals may be sent separate from the frame. A frame that includes control signals will have both control symbols (for example two control symbols /C0/C1/) and data symbols (for example m data symbols (/S0/S1/ . . . /Sm−1). Control Symbol C0 is a symbol that signifies start-of-frame, where as C1 contains additional framing information needed at the framer associated with the Destination 104. The ratio of control to data symbols are consistent with standard SerDes technology, for example for 6.25 Gbaud there are eight data symbols and two control symbols (8:2), and for 10.3125 Gbaud there are 64 data symbols and two control symbols. (64:2). Note that the colon separation format shows ratio of data symbols to control symbols.

Different frame packing schemes may be used to pack the data into the frames. For example, one scheme may be to pack the control symbol (or symbols if any) and then pack one symbol from each MAC. The selection of symbols from each MAC is repeated until the current frame is complete and it is time to form another frame. One way to implement this alternating is by round robin, where the first data symbol is from the first MAC (MAC 0), the second data symbol is from the second MAC (MAC 1), etc. When the last MAC (MAC n−1) has provided its symbol, then the next symbol is from the first MAC (MAC 0). This is repeated until the frame is completed. Another way to implement the alternating is by ad-hoc frame stuffing, where each MAC provides a symbol, in no particular order, and is repeated until the frame is complete. This way provides virtual MAC to physical medium (PHY) connections, but it is more complicated to implement. Another scheme may pack the frame with multiple symbols from each MAC at one time. For example, for a frame with 64 data symbols from eight MACs, the frame may comprise eight symbols from the first MAC, then eight symbols from the second MAC, and so on. However, this scheme may introduce latency into the system as data is being pulled from one MAC at a time.

Note that the framer (or other logic) may substitute MAC encoded 8b10b data with another encoding scheme to improve the BER (Bit Error Ratio) of the Serial data communication channel. The framer (or other logic) may change any other property of a serial data stream, such as DC balance, transition density, run length or coding efficiency. For example, the framer may manipulate frame data to produce a better DC balance bit stream than otherwise provided in the native MAC data. Note that 8b10b is one of many potential coding schemes.

The SerDes 103 takes a parallel frame data and then serializes it into a bit stream. The serial bit stream is then outputted onto the physical medium link, and sent to its Destination. In the example of FIG. 1, the physical link is shown as a two wire link, however other physical media may be used, for example an optical fiber, a twisted pair, a co-axial cable, a single wire link, etc. With a two pair wire link, differential signaling is used in the transmission/reception of data. One wire pair is used for transmission, namely TX+/−, and one wire pair is used for reception, namely RX+/−. Another wire (or wires) may be used to transmit control signals, or the control signals may be embedded in the frame.

The Destination 104 may be another instantiation of the arrangement of FIG. 1, or the Destination may be another device that is capable of using serialized frame data. The Destination may be another chip that is located on the same board as the ASIC 100. The Destination may be another chip that is located on a different board as the ASIC 100, but in the same computer system. The Destination may be located on another computer system from the system that includes ASIC 100.

Typically, the Destination 104 is another instantiation of the arrangement of FIG. 1. The SerDes of the Destination would receive the serialized frame data on the RX+/−wires and then form a frame(s) from the data. The frame would be sent to the framer 102 to unpack the data for use by the MAC(s) of the Destination. This forms a virtual connection between the MACs at the source and Destination locations.

To handle multiple MACs, a SerDes needs to have a speed that is a multiple of the MAC speed plus enough additional overhead to transmit embedded control symbols (if any). For example, a SerDes may have speeds of 3.125 Gbaud, 6.25 Gbaud, 10.325 Gbaud or higher. The higher the speed of the SerDes, the more MACs may be multiplexed onto it.

One way to determine the number of MACs that may be multiplexed onto one or more SerDes is to use the following equations.

$$n*Y+2*X=Z \quad (1)$$

where n=Number of MACs that can be multiplexed, Z= is the aggregate baud rate of one or more SerDes, Y= Baud rate of MAC data, X= Baud rate available for two control characters (X=Z−n*Y). Note that n must be whole number excluding zero.

$$p=n*Y/X \quad (2)$$

where p= number of data symbols per two control characters.

For example, assume that the SerDes is a standard XFI SerDes with a speed of 10.3125 Gbaud, thus Z=10.3125 Gbaud, and the MACS are 1 Gbs MACs with an 8b10b encoded data rate of 1.25 Gbaud.

Therefore from equation (1)

$$n*1.25+2*X=10.3125$$

and from equation (2)
n=8.25−2*X/1.25. Note that n must be a whole number excluding zero.

$$n=8+(0.25-2*X/1.25)$$

Therefore,
0.25−2*X/1.25=0, and X=0.15625 and n=8 meaning that the SerDes in this example can support 1, 2, 4, or 8 MACs in this frame format. Now, $$p=n*Y/X=8*1.25/0.15625=64.$$

Hence, a frame for this example may comprise of two control symbols followed by 64 data symbols followed by two control symbols and 64 data symbols . . . and so on. The 64 data symbols will be provided by the eight MACs, with each MAC providing eight symbols, for example in a round robin manner. If the baud rate is slower, then the number of MACs that can be multiplexed is reduced. For example, for a 6.25 Gbaud SerDes, a maximum of four MACs may be multiplexed.

Figure 2:
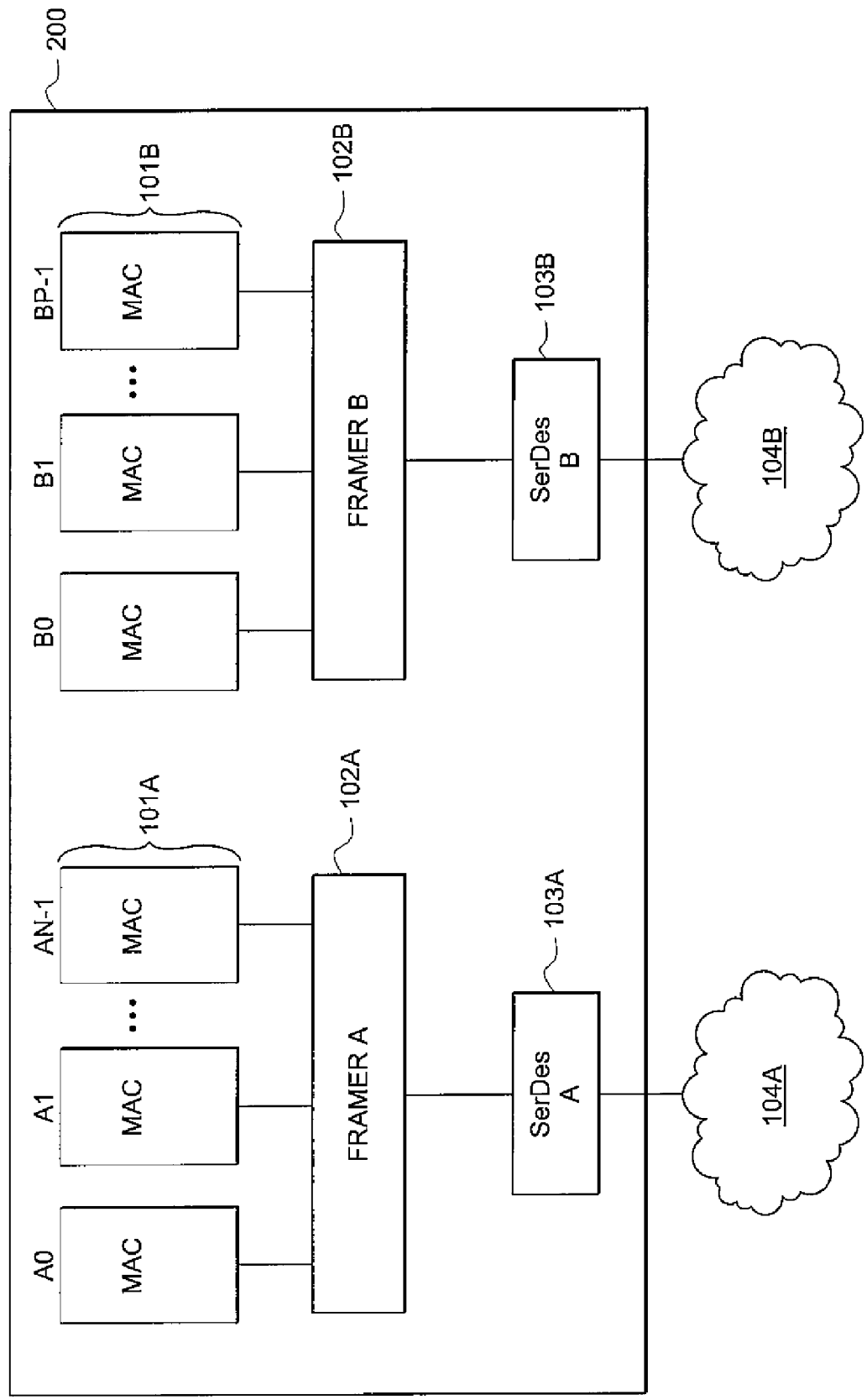
FIG. 2 depicts an arrangement that includes multiple instantiations of the arrangement of FIG. 1.

FIG. 2 depicts an example of an arrangement where an ASIC includes multiple instantiations of the arrangement of FIG. 1. This arrangement is useful where there are more MACs than can be multiplexed with a single SerDes. Note that there are more MACs than SerDes.

Figure 3:
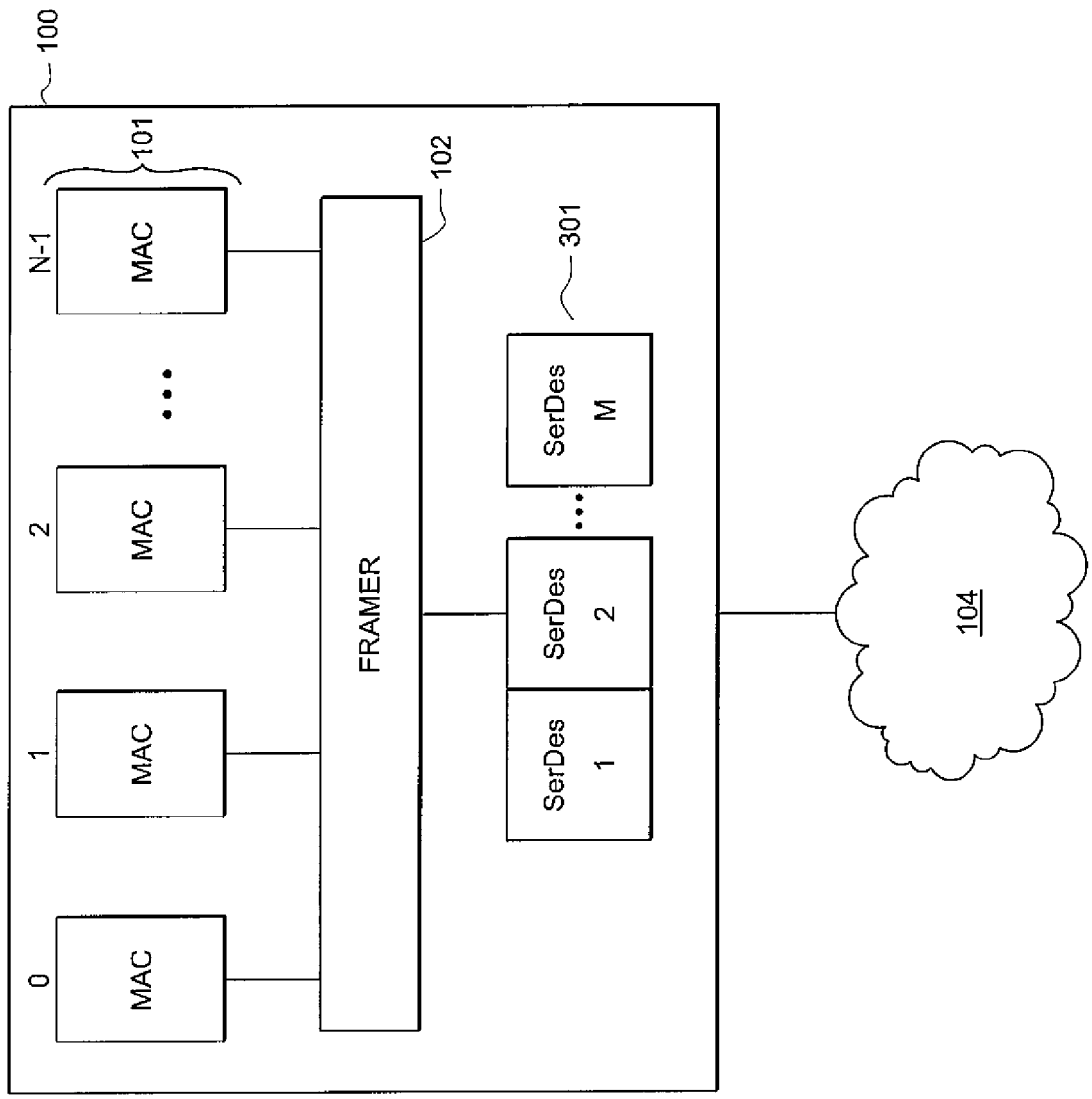
FIG. 3 depicts an alternative arrangement for the arrangement of FIG. 2 according to embodiments of the invention.

FIG. 3 is an alternative arrangement for the system of FIG. 1 or FIG. 2. In this arrangement multiple SerDes 301 are used to send data over a single physical medium. This increases the available bandwidth and potentially allows for more MACs to be multiplexed. Note that there are more MACs than SerDes.

The following tables show examples of frame packing for different numbers of MACs with SerDes devices operating at different speeds. Note that C1 and C2 are the control symbols, and $G_{mn}$ are the data symbols. Note that the m subscript of the data symbols G is the $m^{th}$ data symbol transmitted and the n subscript is the MAC that it originated from. For example, $G_{12}$ is the first symbol from the second MAC. Note that where there is excess capacity on the SerDes (for example two MACs with a SerDes operating at 10.3125 Gbaud) the data symbols are repeated. This is done so that at a set period (e.g. a beat frequency), a new symbol from a MAC is framed. For example, every eight symbols, a new symbol from the first MAC is framed.

TABLE 1

8 × 1/Gbps MACs and a SerDes operating at 10.3125 G baud.

| C1 | C2 | G11 | G12 | G13 | G14 | G15 | G16 | G17 | G18 | G21 | G22 | G23 | ... | G87 | G88 | C1 | C2 | G91 | G92 |

TABLE 2

4 × 1/Gbps MACs and a SerDes operating at 10.3125 G baud.

| C1 | C2 | G11 | G12 | G13 | G14 | G11 | G12 | G13 | G14 | G21 | G22 | G23 | ... | G83 | G84 | C1 | C2 | G91 | G92 |

TABLE 3

2 × 1/Gbps MACs and a SerDes operating at 10.3125 G baud.

| C1 | C2 | G11 | G12 | G11 | G12 | G11 | G12 | G11 | G12 | G21 | G22 | G21 | ... | G81 | G82 | C1 | C2 | G91 | G92 |

TABLE 4

1 × 1/Gbps MAC and a SerDes operating at 10.3125 G baud.

| C1 | C2 | G11 | G11 | G11 | G11 | G11 | G11 | G11 | G11 | G21 | G21 | G21 | ... | G81 | G81 | C1 | C2 | G91 | G91 |

TABLE 5

4 × 1/Gbps MACs and a SerDes operating at 6.25 G baud.

| C1 | C2 | G11 | G12 | G13 | G14 | G21 | G22 | G23 | G24 | C1 | C2 | G31 | G32 | G33 | G34 | G41 | G42 | G43 | G44 |

TABLE 6

2 × 1/Gbps MACs and a SerDes operating at 6.25 G baud.

| C1 | C2 | G11 | G12 | G11 | G12 | G21 | G22 | G21 | G22 | C1 | C2 | G31 | G32 | G31 | G32 | G41 | G42 | G43 | G44 |

TABLE 7

1 × 1/Gbps MAC and a SerDes operating at 6.25 G baud.

| C1 | C2 | G11 | G11 | G11 | G11 | G21 | G21 | G21 | G21 | C1 | C2 | G31 | G31 | G31 | G31 | G41 | G41 | G41 | G41 |

TABLE 8

2 × 1/Gbps MACs and a SerDes operating at 3.125 G baud.

| C1 | C2 | G11 | G12 | G21 | G22 | G31 | G32 | G41 | G42 | C1 | C2 | G51 | G52 | G61 | G62 | G71 | G72 | G81 | G82 |

TABLE 9

1 × 1/Gbps MAC and a SerDes operating at 3.125 G baud.

| C1 | C2 | G11 | G11 | G21 | G21 | G31 | G31 | G41 | G41 | C1 | C2 | G51 | G51 | G61 | G61 | G71 | G71 | G81 | G81 |

Note that scrambling may be used with the selection of idle symbols to reduce EMI characteristics (RFI suppression) without reducing the benefits of frame coding or error detection methods. Scrambling randomizes the serial data stream in order to improve the Bit Error Ratio (BER) through producing longer runs of CIDs (Consecutive Identical Digits). This is done by taking note that any data symbol following a K28.5 symbol is deemed an acceptable idle symbol. One may create a group of data symbols selected for their frequency content and then randomly replace them with the normal D16.2 symbol used by IEEE MACs to represent idle. On the receive side, the receive framer can remove and replace these symbols with D16.2 to render the data stream back to its original form. K28.5 and D16.2 comprise an 8b10b encoded ordered-set that represents idle or the absence of a transmit frame. Scrambling may be used for DC balance. Scrambling may be performed by the framer, the SerDes or other logic device.

The following illustrates a frame format assuming an embodiment using the 10.3125 Gbaud SerDes and MACs using 8b10b encoding. Note that 8b10b encoding is the encoding scheme used in many IEEE 802.3 Physical Coding Sublayers, while (64:2) encoding indicates data symbols to control symbols used by the framer, which is a function of SerDes Baud Rate. Each MAC has its data encoded into 8b 10b symbols, then the symbols from each MAC are framed. In the case of (64:2), there are sixty four, 8b10b symbols packed to a frame with two control characters. This frame is then Serialized and sent to its destination.

$<C0><C1><S1_1>S1_2><S1_3>$
$<S1_{64}><C0><C1><S2_1><S2_2><S2_3>$
$<S2_{64}><C0><C1><S3_1><S3_2><S3_3>$
$<S3_{64}><C0><C1><S4_1><S4_2><S4_3> \ldots <Sy_y> \ldots$ Control symbols <C0> and <C1> from a unique ordered-set of control characters that provide bit-stuffing information necessary to frame 1, 2, 4 or 8 MACs to the 10.3125 Gbaud rate and also provide information for alignment of the code groups to each MAC.

Frame symbols $<Sy_z>$ are 10 bit values derived from code groups $<G_{mn}>$ which are directly mapped from the MAC <n> and the symbol <m> sent into the interface. These code groups are DC balanced per the traditional 8B/10B coding rules which call for alternation of the code group symbols depending on the Running Digital Sum (RDS) of the data stream, however, for this control ordered set, only the RDS of the codes themselves should be considered. Note that DC Balance is a property of the 8b10b line code, where there is an equal (or substantially equal) number of 1's and 0's in successive symbols, and that there are not too many 1's or 0's in a row (i.e. run length of a line code). The framer (or other logic) may substitute MAC symbols with alternative symbols to ensure SerDes serial data maintains proper DC balance and transition density. Both DC balance and transition density are SerDes properties.

The control ordered-set may be as follows:
<C0><C1> where <C0> is the K28.1 symbol and <C1> is a data symbol representing the number of MACs (1, 2, 4 or 8) symbolized by the following data symbols.

TABLE 10

| Cnt 0 Code Group Name | Octet Value | Octet Bits HGF EDCBA | Current RD − abcdei fghj | Current RD + abcdei fghj |
|---|---|---|---|---|
| K28.1 | 3C | 001 11100 | 001111 1001 | 110000 0110 |

TABLE 11

| Cnt 1 Code Group Name (*) | Octet Value | Octet Bits HGF EDCBA | Current RD − abcdei fghj | Current RD + abcdei fghj |
|---|---|---|---|---|
| D1.0 | 01 | 000 00001 | 011101 0100 | 100010 1011 |
| D2.0 | 02 | 000 00010 | 101101 0100 | 010010 1011 |
| D4.0 | 04 | 000 00100 | 110101 0100 | 001010 1011 |
| D8.0 | 08 | 000 01000 | 111001 0100 | 000110 1011 |

The table above shows the case where C1 codes are representing values of 1, 2, 4 and 8, C1 may represent other code values as described below.

The four LSBs of C1 will represent the number of MACs being multiplexed onto the SerDes being used as shown in Table 11 above. Bits C1[7:4] will remain reserved and should be set to zero. Note that the C1 control symbol may be omitted in systems with fixed configurations. A fixed configuration then would have a known pattern for unpacking the TDM frame data and deliver it to the correct MAC.

The above example illustrates framing for SerDes speed of 10.3125 Gbaud. To run at lower such as 3.125 Gbaud and 6.25 Gbaud, the following framing may be used.

$<C0><C1><S1_1><S1_2><S1_3>$
$<S1_8><C0><C1><S2_1><S2_2><S2_3>$
$<S2_8><C0><C1><S3_1><S3_2><S3_3>$
$<S3_8><C0><C1><S4_1 \times S4_2><S4_3> \ldots <S4_8> \ldots$ Note that speeds lower than 10.3125 cannot handle eight MACs, but rather lesser amounts. For example, the 6.25 Gbaud can transmit up to four MAC data streams, and the 3.125 Gbaud can transmit up to two MAC data streams. In both cases, though, the ratio of the data symbols to control symbols is 8:2, so the C0 and C1 symbols are sent for every eight data symbols. It would then transmit with the sequences depicted in Tables 1-9 above.

Figure 4:
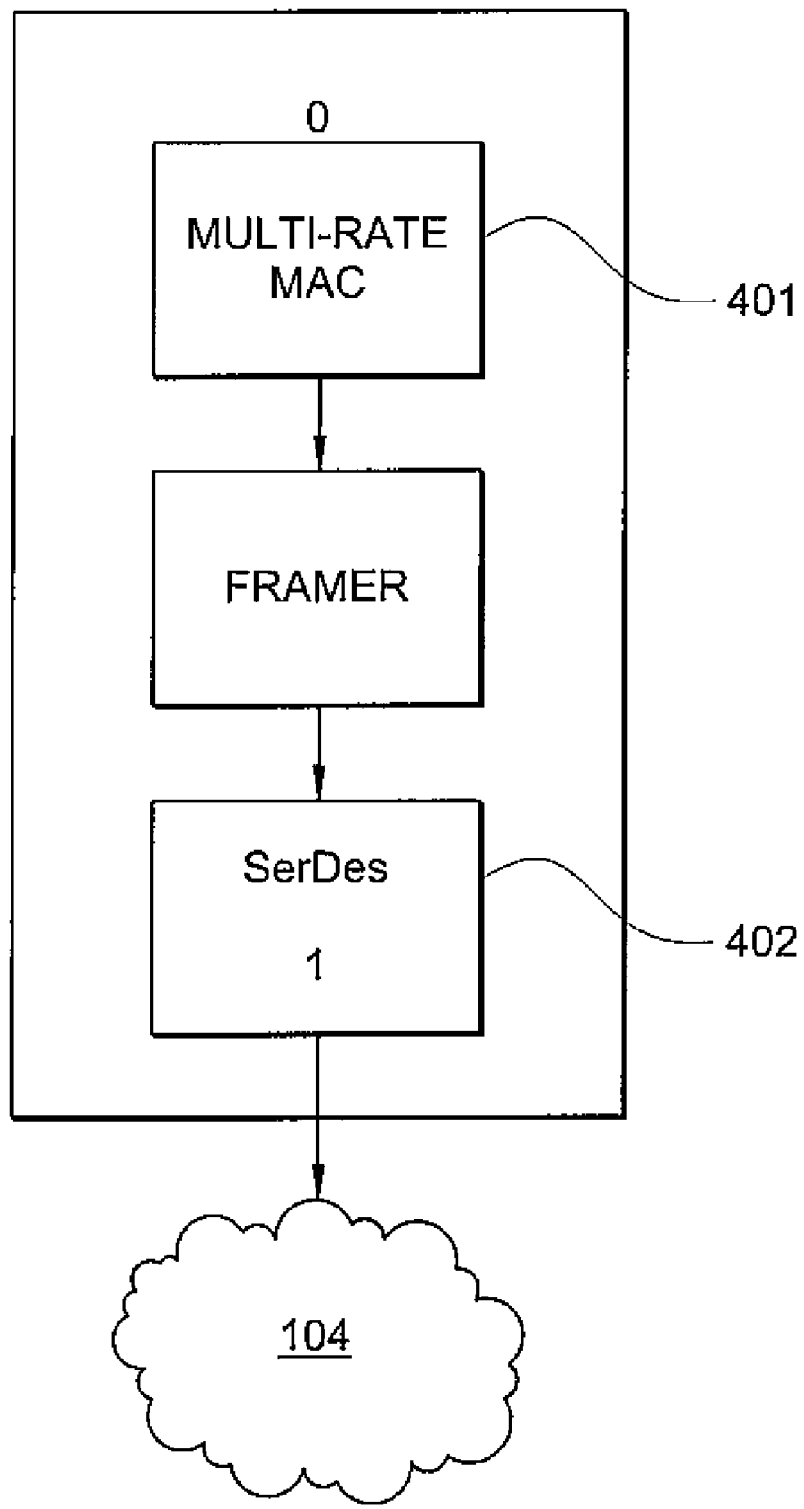
FIG. 4 depicts an alternative arrangement for the arrangement of FIG. 1 according to embodiments of the invention.

A multi-rate SerDes may be able to support operation of different data rates as long as it also supports or adapts to the data symbol to control symbol ratio as determined in Equations 1 and 2. This may be important for error handling operations, high availability operations, high noise environment operations, or potentially just to save power through adaptive power management. Note that the MACs may change speed as well. For example, as shown in FIG. 4, a multi-rate MAC 401 is associated with SerDes 402.

Figure 5:
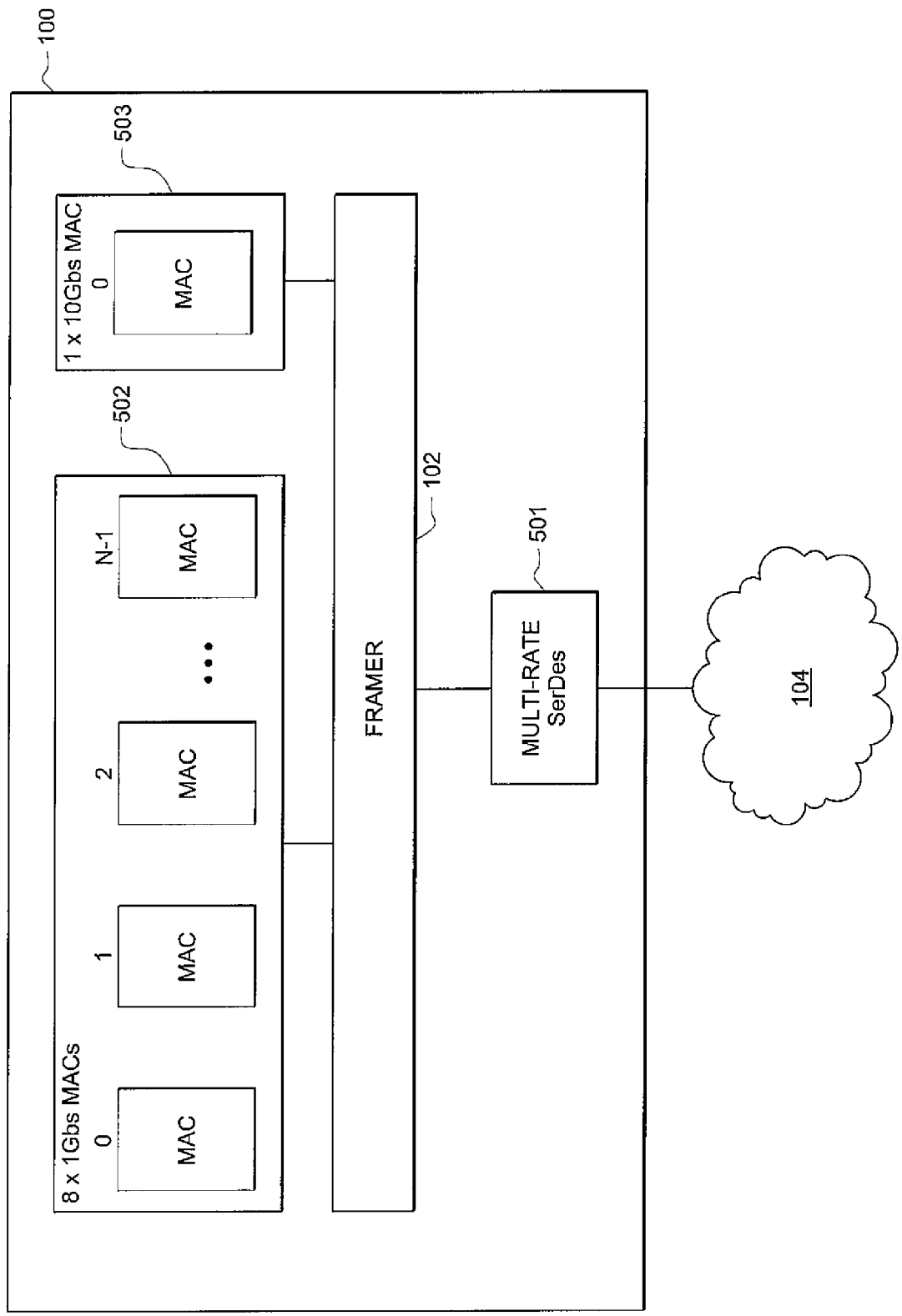
FIG. 5 depicts an alternative arrangement that combines the operation of the arrangements of FIG. 1 and FIG. 4 according to embodiments of the invention.

For example, a multi-rate 10.3125 Gbaud SerDes, which implies a 64:2 ratio, can adjust to a noisy environment by adjusting its baud rate to 6.25 Gbaud and its framing ratio to 8:2. It would then transmit with the sequences depicted in Tables 1-9 above. In other words, bit errors in a high speed system may be reduced or eliminated by reducing the SerDes speed and then adapting the frame control symbol to data symbol ratio accordingly. A multi-rate SerDes may also handle different rate MACs on the same device. For example, as shown in FIG. 5, a multi-rate SerDes is handling several MACs 502 having 1G data rate and one MAC 503 having a 10G data rate, all on the same device using the same PHY interface Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for handling data comprising:
 a plurality of data controllers, wherein each of the plurality of data controllers operates with parallel data, and wherein at least one of the plurality of data controllers operates at a different data rate as compared with at least another one of the plurality of data controllers;
 a framer communicatively connected to the plurality of data controllers, said framer being configured to form at least one data frame with the parallel data from the plurality of data controllers; and
 at least one serializer/deserializer device (SerDes) communicatively connected to the framer, said at least one SerDes being configured to receive the at least one data frame from the framer and produce a serial data stream from the at least one data frame, and to provide the serial data stream to another physical medium for transmission to a Destination;
 wherein a number of the plurality of data controllers is greater than a number of the at least one SerDes device.

2. The system of claim 1 wherein the framer forms the at least one data frame with at least one control-character.

3. The system of claim 1 wherein the framer operates by round robin frame packing of data symbols from the plurality of data controllers.

4. The system of claim 1 wherein the framer operates by ad-hoc frame packing of data symbols from the plurality of data controllers.

5. The system of claim 1 wherein the Destination is one of a different location on a chip, a different chip on a board, a different chip on a different board, a different board in a computer system, and a different board in a different computer system.

6. The system of claim 1 wherein the Destination is another instantiation of the system.

7. The system of claim 1 wherein a number of the plurality of data controllers and a number of the at least one SerDes is determined by:

$n*Y+2*X=Z$; and $p=n*Y/X'$ where n= a number of data controllers, Z= is an aggregate baud rate of the at least one SerDes, Y= is a baud rate of controller data, X= is a baud rate available for two control characters such that $X=Z-n*Y$, and p= a number of data symbols per two control characters.

8. The system of claim 1, wherein the at least one data frame comprises at least one control symbol.

9. The system of claim 1, wherein the system is an Ethernet switch.

10. The system of claim 1, wherein the parallel data is in 8b10b form.

11. The system of claim 10, wherein the framer changes the format of the parallel data to another format.

12. The system of claim 1, wherein the data rate of the at least one SerDes is reduced and a frame control symbol to data symbol ratio is adjusted accordingly.

13. The system of claim 1, wherein the framer manipulates the at least one data frame to produce a DC balanced serial data stream.

14. The system of claim 1, the serial data stream is scrambled to produce a randomized serial data stream.

15. The system of claim 1, wherein a first data controller of the plurality of data controllers operates at a first data rate, and a second data controller of the plurality of data controllers operates at a second data rate that is different from the first data rate.

16. The system of claim 1, wherein the at least one SerDes is to operate at different data rates.

17. The system of claim 1, wherein the at least one frame is formed from a repeating pattern of data from the plurality of data controllers.

18. A system for handling data comprising:
 at least one multi-rate data controller, wherein the at least one multi-rate data controller operates with parallel data at multiple rates, wherein a minimum one of the multiple rates is at least 10e7 bits per second;
 a framer communicatively connected to the at least one multi-rate data controller, said framer being configured to form at least one data frame with the data from the at least one multi-rate data controller;
 at least one serializer/deserializer device (SerDes) communicatively connected to the framer, said at least one SerDes being configured to receive data from the framer and produce a serial data stream from the frame, and to provide the data stream to a physical medium for transmission to a destination.

19. The system of claim 18, wherein the at least one multi-rate data controller is to operate with at least one of a minimum rate of 10e8, 10e9, and 10e10 bits per second.

* * * * *

UNITED STATES PATENT AND TRADEMARK OFFICE
CERTIFICATE OF CORRECTION

PATENT NO. : 8,089,960 B2
APPLICATION NO. : 11/669813
DATED : January 3, 2012
INVENTOR(S) : Joseph A. Curcio, Jr. et al.

Page 1 of 1

It is certified that error appears in the above-identified patent and that said Letters Patent is hereby corrected as shown below:

In the Claims:

In column 9, line 31, in Claim 2, delete "control-character." and insert -- control character. --, therefor.

In column 9, line 49, in Claim 7, delete "p=n*Y/X'" and insert -- p=n*Y/X, --, therefor.

In column 10, line 20, in Claim 14, after "claim 1," insert -- wherein --.

Signed and Sealed this
Seventeenth Day of September, 2013

Teresa Stanek Rea
*Deputy Director of the United States Patent and Trademark Office*